United States Patent
Ghanaie-Sichanie et al.

(10) Patent No.: US 11,356,289 B2
(45) Date of Patent: *Jun. 7, 2022

(54) THROTTLING AND PRIORITIZATION OF MULTIPLE DATA STREAMS

(71) Applicant: Microsoft Technology Licensing, LLC, Redmond, WA (US)

(72) Inventors: Arash Ghanaie-Sichanie, Woodinville, WA (US); Sriram Srinivasan, Redmond, WA (US); Wei Xiong, Seattle, WA (US); Bin Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,749

(22) Filed: Sep. 4, 2020

(65) Prior Publication Data

US 2021/0135896 A1    May 6, 2021

Related U.S. Application Data

(63) Continuation of application No. 16/672,265, filed on Nov. 1, 2019, now Pat. No. 10,771,272.

(51) Int. Cl.
*H04W 28/16* (2009.01)
*H04L 12/18* (2006.01)
(Continued)

(52) U.S. Cl.
CPC ...... *H04L 12/1827* (2013.01); *H04L 12/1818* (2013.01); *H04L 12/1822* (2013.01);
(Continued)

(58) Field of Classification Search
CPC ............. H04L 12/1818; H04L 12/1822; H04L 12/1827; H04L 12/1831; H04L 12/4625;
(Continued)

(56) References Cited

U.S. PATENT DOCUMENTS 7,627,629 B1 * 12/2009 Wu ..................... H04L 12/1818
   348/14.09
2010/0332674 A1   12/2010 Van et al.
(Continued)

FOREIGN PATENT DOCUMENTS

EP         3383035 A1    10/2018
WO     2011087356 A2     7/2011

OTHER PUBLICATIONS

"International Search Report and Written Opinion Issued in PCT Application No. PCT/US20/047708", dated Nov. 9, 2020, 13 Pages.

*Primary Examiner* — Le H Luu
(74) *Attorney, Agent, or Firm* — NovoTechIP International PLLC

(57) ABSTRACT

Techniques for prioritization of data streams include transmitting a plurality of data streams to a first device over a network where each data stream is configured to cause the first device to perform a specific function, dynamically detecting a bandwidth limitation limiting an amount of available bandwidth for transmitting the plurality of data streams, dynamically determining bandwidth reduction criteria by identifying a first subset of the plurality of data streams to stop transmitting based on the specific function that each respective data stream causes the first device to perform, temporarily stopping transmitting of the first subset of data streams configured to cause the first device to perform a first set of functions, and continuing to transmit a second subset of data streams not included in the first subset of the data streams to the first device to cause the first device to continue to perform a second set of functions.

20 Claims, 7 Drawing Sheets

(51) Int. Cl.

| | | |
|---|---|---|
| H04W 28/24 | (2009.01) | |
| H04W 28/20 | (2009.01) | |
| H04W 28/18 | (2009.01) | |
| H04L 65/1093 | (2022.01) | |
| H04L 65/4038 | (2022.01) | |
| H04L 65/1089 | (2022.01) | |
| H04L 65/80 | (2022.01) | |
| H04N 7/15 | (2006.01) | |
| H04N 21/647 | (2011.01) | |

(52) U.S. Cl.
CPC ...... *H04L 12/1831* (2013.01); *H04L 65/1089* (2013.01); *H04L 65/1093* (2013.01); *H04L 65/4038* (2013.01); *H04L 65/80* (2013.01); *H04N 7/15* (2013.01); *H04N 21/64738* (2013.01); *H04N 21/64769* (2013.01); *H04W 28/16* (2013.01); *H04W 28/18* (2013.01); *H04W 28/20* (2013.01); *H04W 28/24* (2013.01)

(58) Field of Classification Search
CPC ............. H04L 65/1089; H04L 65/1093; H04L 65/4038; H04L 65/80; H04L 43/08; H04L 69/24; H04N 7/15; H04N 21/64738; H04N 21/64769; H04N 19/23; H04N 7/18; H04W 28/16; H04W 28/18; H04W 28/20; H04W 28/24; G06F 16/1748; G06Q 10/063; G06T 19/006
See application file for complete search history.

(56) References Cited

U.S. PATENT DOCUMENTS

| | | | |
|---|---|---|---|
| 2011/0096699 | A1 | 4/2011 | Sakhamuri et al. |
| 2013/0265919 | A1* | 10/2013 | Pochiraju ................ H04L 69/24 370/310 |
| 2015/0100355 | A1* | 4/2015 | Tanimoto ............ G06Q 10/063 705/7.11 |
| 2017/0212907 | A1* | 7/2017 | VanderSpek ........ G06F 16/1748 |
| 2018/0091564 | A1 | 3/2018 | Ivov et al. |
| 2018/0131950 | A1* | 5/2018 | Guo ........................ H04N 19/25 |
| 2018/0137599 | A1* | 5/2018 | Westerhoff ................ G06T 1/20 |
| 2019/0251743 | A1* | 8/2019 | Koyama ................ G09B 21/00 |
| 2019/0334994 | A1* | 10/2019 | Bower, III .......... G06F 11/3089 |
| 2020/0036816 | A1* | 1/2020 | Babu J D ............. H04W 4/021 |

* cited by examiner

THROTTLING AND PRIORITIZATION OF MULTIPLE DATA STREAMS

CROSS-REFERENCE TO RELATED APPLICATION

This application claims the benefit of priority from pending U.S. patent application Ser. No. 16/672,265, filed on Nov. 1, 2019, and entitled "Throttling and Prioritization for Multichannel Audio and/or Multiple Data Streams for Conferencing" and is related to U.S. patent application Ser. No. 16/672,200, filed on Nov. 1, 2019, and entitled "Automatic Detection Of Presentation Surface and Generation of Associated Data Stream," and to U.S. Provisional Patent Application No. 62/929,683, filed on Nov. 1, 2019, and entitled "Teleconferencing Device Capability Reporting and Selection." The entire contents of the above-referenced applications are incorporated herein by reference.

BACKGROUND

Teleconferencing systems provide users with the ability to conduct productive meetings while located at separate locations. Teleconferencing systems may capture audio and/or video content of an environment in which the meeting is taking place to share with remote users and may provide audio and/or video content of remote users so that meeting participants can more readily interact with one another. There are significant areas for new and approved mechanisms for facilitating more immersive and productive meetings.

SUMMARY

An example data processing system according to a first aspect of the invention include a processor and a computer-readable medium. The computer-readable medium stores executable instructions for causing the processor to perform operations including transmitting a plurality of data streams to a first device over a network, wherein each data stream is configured to cause the first device to perform a specific function, dynamically detecting a bandwidth limitation that limits an amount of available bandwidth for transmitting the plurality of data streams, dynamically determining bandwidth reduction criteria, responsive to detecting the bandwidth limitation, by identifying a first subset of the plurality of data streams to stop transmitting based on the specific function that each respective data stream causes the first device to perform, temporarily stopping transmitting of the first subset of the plurality of data streams configured to cause the first device to perform a first set of functions, and continuing to transmit a second subset of the plurality of data streams not included in the first subset of the data streams to the first device to cause the first device to continue to perform a second set of functions.

An example method executed by a data processing system for prioritization of data streams according to the disclose includes transmitting a plurality of data streams to a first device over a network, wherein each data stream is configured to cause the first device to perform a specific function, dynamically detecting a bandwidth limitation that limits an amount of available bandwidth for transmitting the plurality of data streams, dynamically determining bandwidth reduction criteria, responsive to detecting the bandwidth limitation, by identifying a first subset of the plurality of data streams to stop transmitting based on the specific function that each respective data stream causes the first device to perform, temporarily stopping transmitting of the first subset of the plurality of data streams configured to cause the first device to perform a first set of functions, and continuing to transmit a second subset of the plurality of data streams not included in the first subset of the data streams to the first device to cause the first device to continue to perform a second set of functions.

An example memory device according to the disclosure stores instructions that, when executed on a processor of a data processing system, cause the processor of the data processing system to prioritize data streams, by: transmitting a plurality of data streams to a first device over a network, wherein each data stream is configured to cause the first device to perform a specific function, dynamically detecting a bandwidth limitation that limits an amount of available bandwidth for transmitting the plurality of data streams, dynamically determining bandwidth reduction criteria, responsive to detecting the bandwidth limitation, by identifying a first subset of the plurality of data streams to stop transmitting based on the specific function that each respective data stream causes the first device to perform, temporarily stopping transmitting of the first subset of the plurality of data streams configured to cause the first device to perform a first set of functions, and continuing to transmit a second subset of the plurality of data streams not included in the first subset of the data streams to the first device to cause the first device to continue to perform a second set of functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are disclosed herein for throttling and prioritization algorithms for multichannel audio and/or multiple data streams associated with a communication session. A communication system may include one or more source devices that are configured to generate a plurality of data streams associated with a communication session. These data streams may include audio or audiovisual streams, and the data streams may be generated for numerous purposes as will be seen in the example implementations that follow. The various data streams can provide various types of content that may be shared with participants of the communication session and/or processed by the cloud-based elements of the communication system to provide a rich, interactive user experience for participants of the communications session. Transmitting the various data streams can require significant amounts of bandwidth, and how to handle these data streams in response to bandwidth limitations without unduly impacting the user experience is a significant technical problem. The techniques disclosed herein provide solutions to this problem by prioritizing and/or throttling of these data streams in bandwidth constrained situations. A bandwidth limitation can be detected which would limit the amount of data that the source device may transmit during the communication session. In response to detecting the bandwidth limitation, one or more data streams that would typically be provided by the source device may be stopped at least temporarily while the bandwidth limitation is present. The data rates of one or more data streams may be throttled to reduce the bandwidth constraints. The streams can be prioritized based on user policy, by an organization's policy, or based on other factors, such as which users are participating in a communication session and the capabilities of computing devices of the users to provide the best user experience possible while under the bandwidth limitation. These techniques may be implemented in the source device, in cloud-based components of the communications system, in receiver devices configured to receive the content provided by the source device, or a combination thereof. The examples that follow illustrates these concepts.

Figure 1:
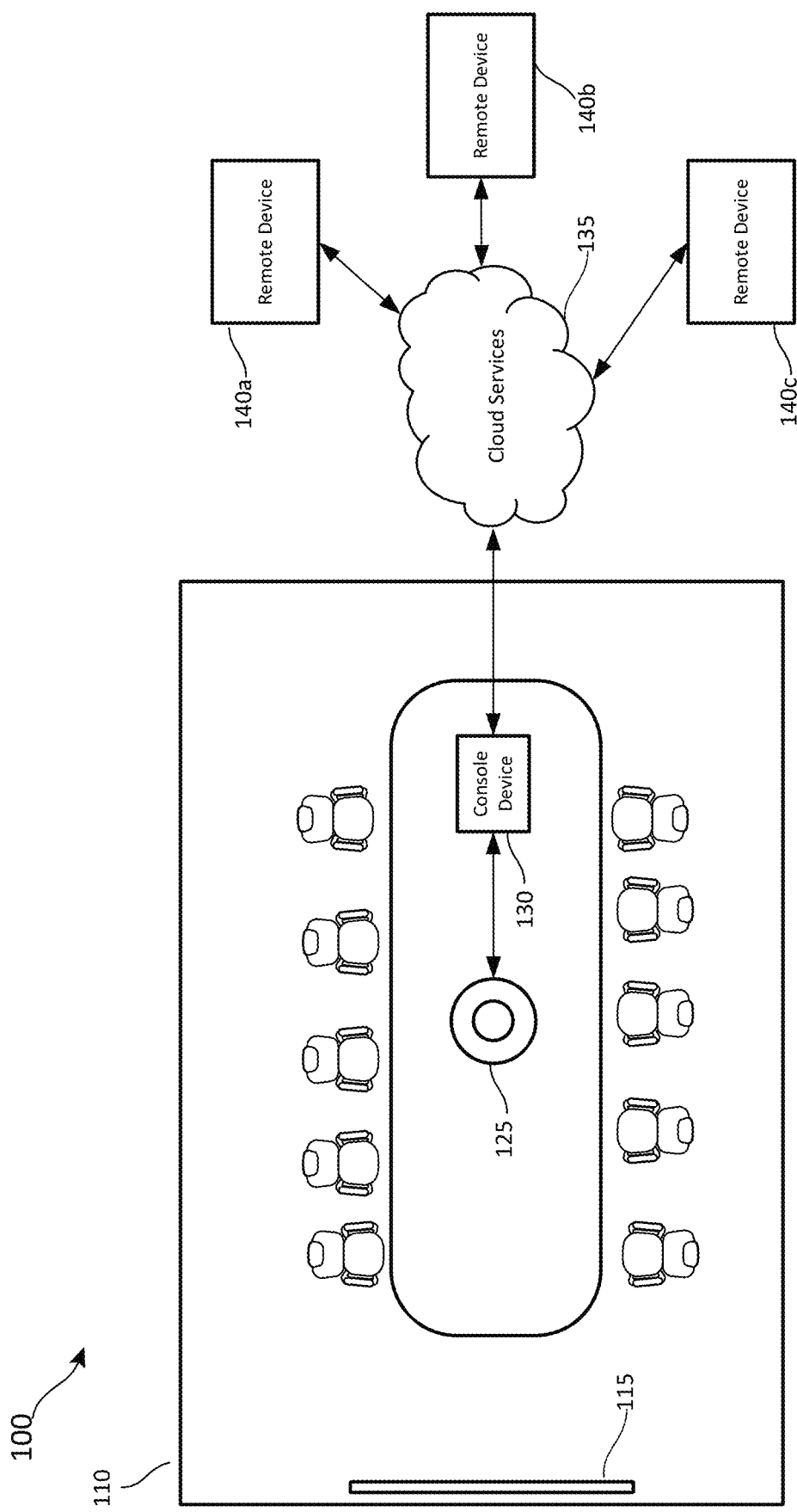
FIG. 1 presents an example environment in which a communication session according to the techniques disclosed herein may be used.

FIG. 1 presents an example environment 100 in which a communication session may be may take place. The environment 100 may comprise a meeting room 110 or other area dedicated to conducting meetings, as in the example environment 100 illustrated in FIG. 1 or may be another space in which at least one participant may be physically present and in which the conferencing system components may be located. The conferencing system in this example includes a source device 125 (also referred to herein as an "endpoint device"), and a console device 130. In the example implementation illustrated in FIG. 1, there is a single source device 125 communicably coupled with the console 130. In other implementations, multiple source devices may be present in the environment from which the communication session is being conducted. One or more remote devices, such as the remote device 140a-140c, may be associated with the conferencing system and provide a user interface that enables remote participants to a communication session to receive one or more media streams associated with the communication session from the source device 125.

The console device 130 is communicably coupled to the cloud services 135 via one or more wired and/or wireless network connections. The cloud services 135 may comprise one or computer servers that are configured to facilitate various aspects of a communication session. The cloud services 135 may be configured to coordinate the scheduling and execution of a communication session. The cloud services 135 may be configured to facilitate routing media streams provided by source devices, such as the source device 125, to receiver devices, such as the remote devices 140a-140c.

While the source device 125 is illustrated as a desktop or tabletop computing device in the example embodiments disclosed herein, the source device 125 is not limited to such a configuration. In some implementations, the functionality of the console device 130 may be combined with that of the source device 125 into a single device. The functionality of the source device 125 may be implemented as a portable electronic device, such as a mobile phone, a tablet computer, a laptop computer, a portable digital assistant device, a portable game console, and/or other such devices. The source device 125 may also be implemented in computing devices having other form factors, such as a vehicle onboard computing system, a video game console, a desktop computer, and/or other types of computing devices.

The remote devices 140a-140c are computing devices that may have the capability to present one or more type of media stream provided by the source device 125, such as media streams that comprise audio, video, images, text content, and/or other types of media stream. Each of the remote devices 140a-140c may have different capabilities based on the hardware and/or software configuration of the respective remote device. While the example illustrated in FIG. 1 includes three remote devices, a communication session may include fewer than three remote devices or may include more than three remote devices. The remote devices 140a-140c may be implemented as a portable electronic device, such as a mobile phone, a tablet computer, a laptop computer, a portable digital assistant device, a portable game console, and/or other such devices. The remote devices 140a-140c may also be implemented in computing devices having other form factors, such as a vehicle onboard computing system, a video game console, a desktop computer, and/or other types of computing devices.

The meeting room 110 also includes a whiteboard 115 which includes a presentation surface upon which participants of the meeting may take notes, draw diagrams, sketch ideas, and/or capture other information related to the communication session. While the example illustrated in FIG. 1 includes a whiteboard, the source device 125 may be configured to detect and capture a media stream for other types of presentation surfaces, such as a note pad or other object that includes a presentation surface. In some implementations, the whiteboard or other presentation surface may be in a fixed location similar to the whiteboard 115 illustrated in FIG. 1. In other implementations, the whiteboard or other presentation surface may not have a fixed location. For example, a whiteboard or notepad may be placed on an easel or stand that may be moved to different locations within the environment in which the communication session takes place. A notepad, note paper, or other similar presentation surface may rest on a conference room table or other such surface. Some implementations may not include such a presentation surface that may be detected by the source device 125 and included as a media stream in a communication session.

Figure 2:
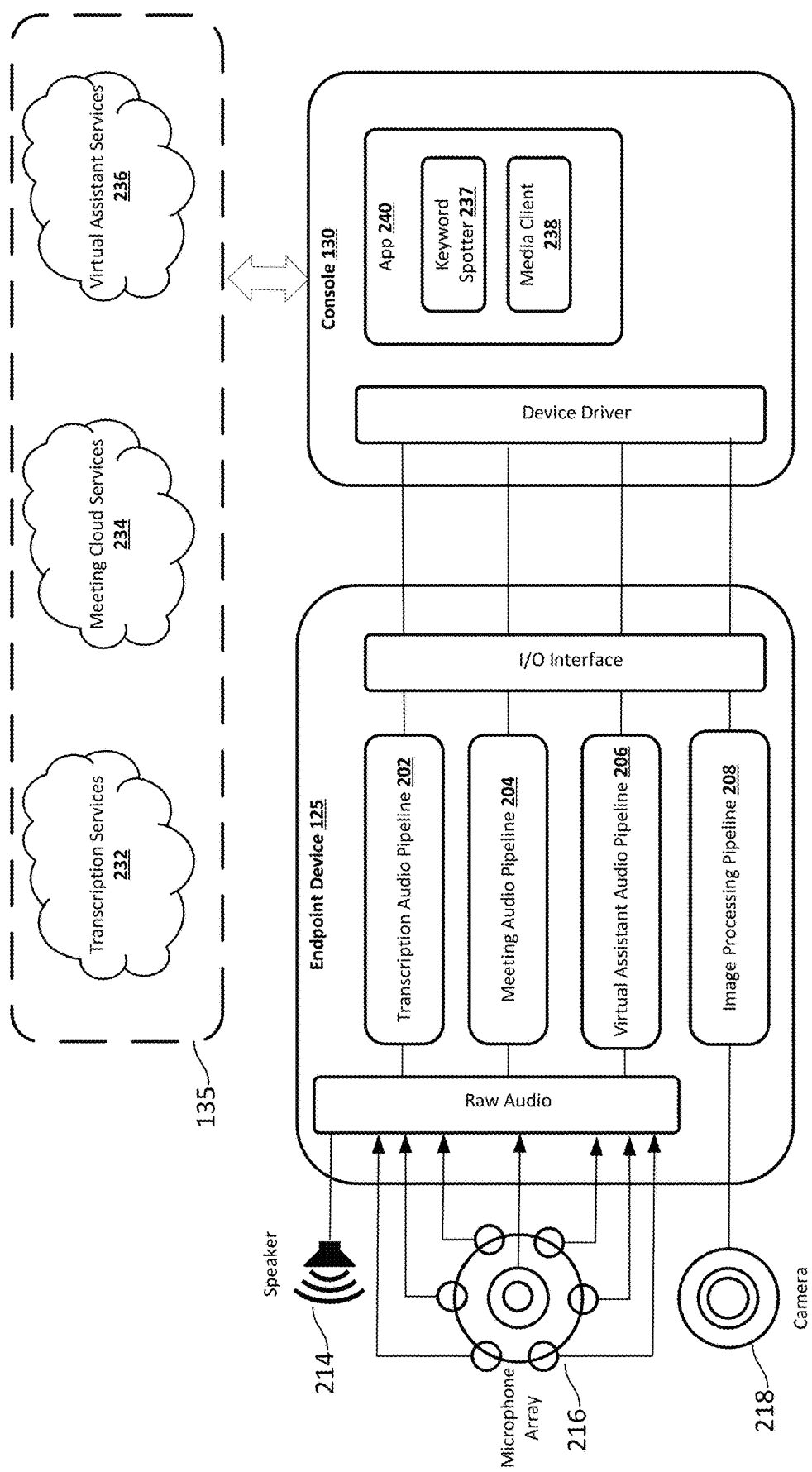
FIG. 2 is a diagram that an example source device and the console, such as those illustrated in FIG. 1.

FIG. 2 is a diagram that provides additional details of the source device 125, the console 130, and the cloud services 135. The source device 125 is configured to capture audio and/or video signals to generate media streams that may be processed by the source device 125, the console 130, the cloud services 135, or a combination thereof. The cloud services 135 may process the media streams further as will be discussed in the examples that follow and/or may selectively route one or more media streams to the receiver devices 140a-140c. The source device 125 illustrated in FIG. 2 includes three audio pipelines for processing audio captured by the source device 125, including a transcription audio pipeline 202, a meeting audio pipeline 204, and a virtual assistant audio pipeline 206. The source device 125 also includes an image processing pipeline 208 for processing images and video content. The audio and image processing pipelines of the example implementation of FIG. 2 are intended to illustrate some of the types of audio and/or image processing that the source device 125 may perform to produce various types of media streams for a communication session. Other types of processing pipelines may be included in other implementations of the source device in addition to or instead of one or more of the processing pipelines in this example implementation. Furthermore, the source device 125 is discussed as being configurable to produce various types of media streams that may be provided to the cloud services 135 and/or to the receiver devices participating in a communication session. The media streams discussed herein are intended to illustrate examples of some of the types of media streams that may be generated by the source device 125. Other implementations may be configured to generate other types of media streams in addition to or instead of one or more of the media streams discussed in this example.

The source device 125 may include a speaker 214, a microphone array 216, and a camera 218. The source device 125 may be configured to output audio content associated with the communication session via the speaker 214. The audio content may include speech from remote participants and/or other audio content associated with the communication session. The microphone array 216 includes a plurality of microphones that may be used to capture audio from the environment in which the communication session occurs. The use of a microphone array to capture audio may be used to obtain multiple audio signals that can be used to determine directionality of a source of audio content. The audio signals output by the microphone array 216 may be analyzed by the endpoint 125, the console 130, the cloud services 135, or a combination thereof to provide various services which will be discussed in greater detail in the examples which follow. The camera 218 may be a 360-degree camera that is configured to capture a panoramic view of the environment in which the communication session occurs. The output from the camera 218 may need to be further processed by the image processing pipeline 208 to generate the panoramic view of the environment in which the source device 125 is located. The source device 125 may also be connected additional microphone(s) for capturing audio content and/or additional camera(s) for capturing images and/or video content. The audio quality of the additional microphone(s) may be different from the audio quality of the microphone array 216 and may provide improved audio quality. The image quality and/or the video quality provided by the additional camera(s) may be different from the image quality and/or the video quality provided by the camera 218. The additional camera(s) may provide improved image quality and/or video quality. Furthermore, the additional cameras may be 360-degree cameras or may have a field of view (FOV) that is substantially less than 360 degrees.

The source device 125 may be configured to process audio content captured by the microphone array 216 in order to provide various services in relation to the communication session. In the example illustrated in FIG. 2, the source device 125 includes audio pipelines for processing audio inputs to produce audio-based media streams and an image processing pipeline to produce image-based and/or video-based media streams. Some implementations of the source device 125 may only be capable of producing audio-based media streams, while other implementations may be capable of producing both audio-based and image-based and/or video-based media stream.

The source device 125 may include a transcription audio pipeline 202. The transcription audio pipeline 202 may be configured to process audio captured by the microphone array to facilitate automated transcriptions of communications sessions. The transcription audio pipeline 202 may perform pre-processing on audio content from the microphone array 216 and send the processed audio content to the transcription services 232 of the cloud services 135 for processing to generate a transcript of the communication session. The transcript of the communication session may provide a written record what is said by participants physically located in the environment at which the communication session occurs and may also include what is said by remote participants using the remote devices 140a-140c. The remote participants of the communication session may be participating on a computing device that is configured to capture audio content and is configured to route the audio content to the transcription services 232 and/or the other cloud services 135. The transcription services 232 may be configured to provide diarized transcripts that not only include what was said in the meeting but who said what. The transcription services 232 can use the multiple audio signals captured by the microphone array 216 to determine directionality of audio content received by the microphone array 216. The transcription services 232 can use these signals in addition to other signals that may be provided by the source device 125 and/or the console 130 to determine which user is speaking and record that information in the transcripts. In some implementations, the transcription audio pipeline 202 may be configured to encode the audio input received from the microphone array using the Free Lossless Audio Codec (FLAC) which provides lossless compression of the audio signals received from the microphone array 216.

The source device may include a meeting audio pipeline 204. The meeting audio pipeline 204 may process audio signals received from the microphone array 216 for generation of audio streams to be transmitted to remote participants of the communication session and for Voice over IP (VOIP) calls for participants who have connected to the communication session via a VOIP call. The audio pipeline 204 may be configured to perform various processing on the audio signals received from the microphone array 216, such as but not limited to gain control, linear echo cancellation, beamforming, echo suppression, and noise suppression. The output from the meeting audio pipeline 204 may be routed to the meeting cloud services 234, which may perform additional processing on the audio signals. The meeting cloud services 234 may also coordinate sending audio-based, image-based, and/or video-based media streams generated by the source device 125 and/or by the computing devices of one or more remote participants to other participants of the communication session. The meeting cloud services 234 may also be configured to store content associated with communication session, such as media streams, participant information, transcripts, and other information related to the communication session.

The source device 125 may include a virtual assistant audio pipeline 206. The virtual assistant audio pipeline 206 may be configured to process audio signals received from the microphone array 216 to optimize the audio signal for automated speech recognition (ASR) processing by the virtual assistant services 236. The source device 125 may transmit the output of the virtual assistant audio pipeline 206 to the virtual assistant services 236 for processing via the console 130. The virtual assistant audio pipeline 206 may be configured to recognize a wake-word or phrase associated with the virtual assistant and may begin transmitting processed audio signals to the virtual assistant services 236 in response to recognizing the wake-word or phrase. The virtual assistant services 236 may provide audio responses to commands issued to via the source device 125 and the responses may be output by the speaker 214 of the source device 125 and/or transmitted to the computing devices of remote participants of the communication session. The participants of the communication session may request that the virtual assistant perform various tasks, such as but not limited to inviting additional participants to the communication session, looking up information for a user, and/or other such tasks that the virtual assistant is capable of performing on behalf of participants of the communication session.

The source device 125 may include an image processing pipeline 208. The image processing pipeline 208 may be configured to process signals received from the camera 218. The camera 218 may be a 360 degrees camera capable of capturing images and/or video of an area spanning 360 degrees around the camera. The camera 218 may comprise multiple lenses and image sensors and may be configured to output multiple photographic images and/or video content having an overlapping field of view. The image processing pipeline 208 may be configured to stitch together the output of each of the images sensors to produce panoramic images and/or video of the environment surrounding the camera 218. The panoramic images and/or video may be processed by the images processing pipeline 208 to produce one or more dedicated media streams for participants of the communication session, the presentation surface, and/or an area of interest. The image processing pipeline 208 may include an encoder for encoding video output from the camera 218 that may use Advanced Video Coding, also referred to as H.264 or MPEG-4 Part 10, Advanced Video Coding (MPEG-4 AVC).

Figure 8:
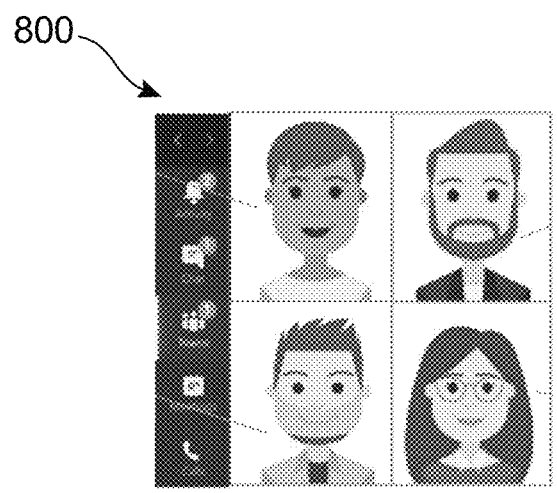
FIG. 8 is diagram of a user interface that may be used to display multiple media streams associated with a communication session.

The image processing pipeline 208 may be configured to process the output of the camera 214 and to generate panoramic images and/or video of the environment surrounding the source device 125. FIG. 8 is an example of an example of a stitched high-resolution panoramic image 800 that includes participants present in the environment in which a communication session is being conducted. The panorama may also capture a presentation surface, such as whiteboard or other such presentation surface if present in the environment in which the communication session is taking place and may include that presentation surface in the panorama along with the participants detected. The images processing pipeline 208 may generate a first media stream that includes the panorama. The media stream may comprise a series of panoramic images and/or panoramic video representing the environment in which the communication session is taking place.

The image processing pipeline 208 may include presentation surface detection logic configured to detect a presentation surface, such as but not limited to one or more whiteboards, one or more notepads (which may comprise a stack of sheets of paper for taking notes which may be torn off or separated from the stack), a chalk board, a glass board, a flipchart board (which may comprise sheets of paper or other writing material that may be flipped out of the way or removed), a cork board, a cardboard, or any other type of board or screen used for writing, drawing, and/or presenting. The presentation surface logic may also determine whether the presentation surface is being used by a participant of the communication session and generate a dedicated media stream for the presentation surface in response to detecting that the presentation surface is being used. Producing a dedicated media stream for the presentation surface provides a technical solution to the technical problem of how to effectively share written or drawn content with remote participants of the communication session. The dedicated media stream can also be saved with other content associated with the communication session to provide participants with access to the written or drawn notes after the meeting is has been completed.

The image processing pipeline 208 may include segmentation & occlusion logic configured to segment the media stream comprising the whiteboard or other presentation surface into at least a foreground portion, a background portion, and a presentation surface portion. The foreground portion may include objects and/or participants located in the environment in which the communication session is taking place which are occluding at least a portion of the whiteboard or other presentation surface. The segmentation & occlusion logic may be configured recognize when a region of the presentation surface is obscured by a participant to the communication session or object in the environment in which the communication session is taking place and to render a composite image that simulates a view of the obscured content.

The image processing pipeline 208 may be configured to generate a user interface that may include the multiple media steams. This user interface may be displayed on a display of the console device 130 for participants of the communication session that are present in the meeting room 110. A similar user interface may also be rendered on a display of the receiver devices, such as the remove devices 140a-140c. An example of such a user interface is illustrated in FIG. 8, which illustrates an example active streams interface 800 in which a plurality of media streams may be rendered. The image processing pipeline 208 may be configured to include a plurality of media streams related to at least a subset of participants of the communication session into a single media stream for rendering on the active streams interface 800. The plurality of media streams may be arranged and rendered in a grid or array proximate to one another on a display of a computing device of remote users and/or an source device with display capabilities, such as in the active streams interface 800 illustrated in FIG. 8 which illustrates one possible configuration for such an interface. The active streams interface 800 may include one or more users who are actively speaking, one or more users who are determined to be reacting to an event or content of the communication session. The active streams interface 800 may include a stream dedicated to a whiteboard or other presentation surface and/or to an area of interest that is a focus of user attention. In some implementations, the image processing pipeline 208 may render the active streams interface 800 as an additional media stream that may be rendered on a display of a receiving device.

Figure 6A:
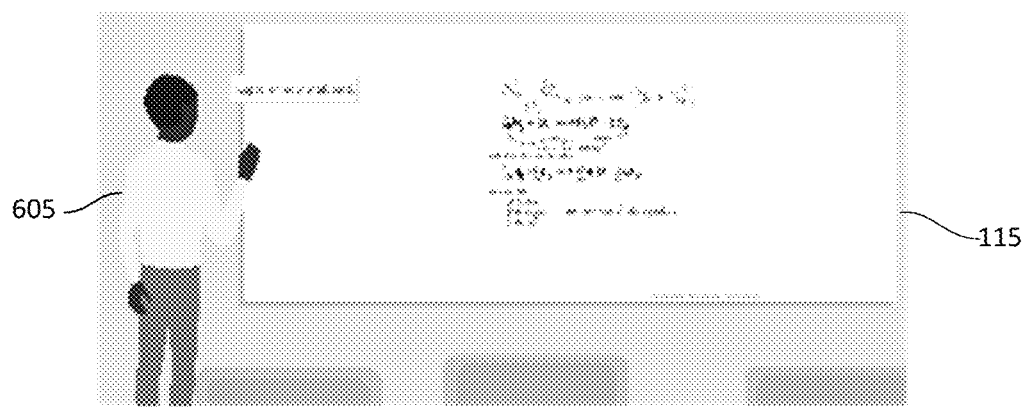
FIG. 6A illustrates an example in which a whiteboard has been detected in a media stream captured by a camera of the source device.
Figure 6B:
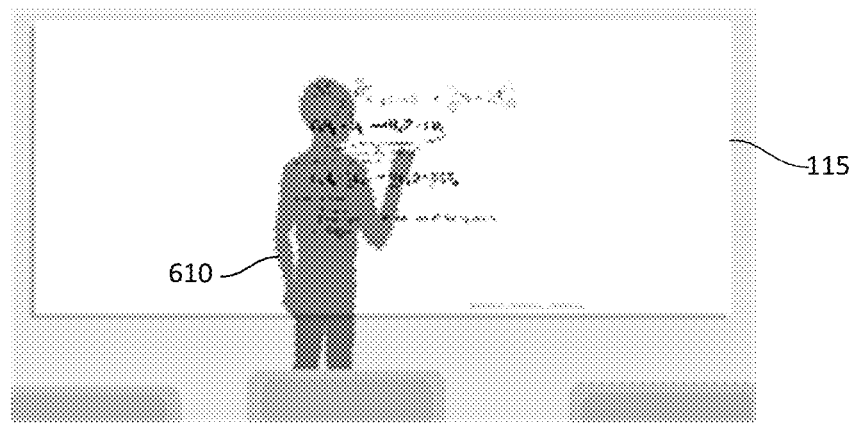
FIG. 6B illustrates an example in which a transparent representation of a person is displayed over the presentation surface of the whiteboard in which occluded content is made at least partially visible.
Figure 7:
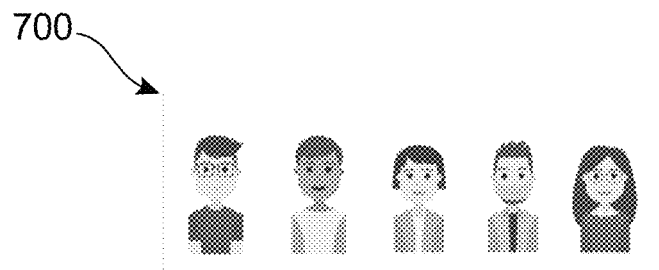
FIG. 7 is an example of an example of a stitched high-resolution panoramic image that includes participants present in the environment in which a communication session is being conducted.

FIG. 6A illustrates an example in which a whiteboard 115 has been detected. A participant 605 of the conferencing session has also been detected in foreground, which may indicate that the participant 605 is going to use a presentation surface of the whiteboard 115. The image processing pipeline 208 may generate a media stream dedicated to the whiteboard 115 responsive to detecting that the participant 605 is using or about to use the whiteboard. The dedicated media stream may be shown on the active streams interface 800, which includes an array or grid of active streams associated with participants to the communication session and/or with objects of interest, such as the whiteboard 115. FIG. 6B illustrates an example of the whiteboard 115 being rendered with a transparent representation 610 of the participant 605 rendered over the whiteboard 115. The contents of the presentation surface of the whiteboard 115 that would otherwise be obscured by the body of participant 605 are rendered based on a set of most recently known contents of the obscured region of the presentation surface. The image processing pipeline 208 may generate a dedicated media stream comprising the transparent representation 610 and the rendering of the obscured content which may be provided to participants of the communication session. The dedicated stream may be included in the active streams interface 800 which may be rendered on a display of a computing device of participants to the communication session. Additional features of the image processing pipeline 208 of the source device 125 in the examples which follow.

The console 130 may comprise a computing device that may serve as a communication relay between the source device 125 and the cloud services 135. The source device 125 may include an input/output (I/O) interface that provides a wired and/or wireless connection between the source device 125 and the console 130. In some implementations, the I/O interface may comprise a Universal Serial Bus (USB) connector for communicably connecting the source device 125 with the console 130. In some implementations, the console may comprise a general-purpose computing device, such as a laptop, desktop computer, and/or other computing device capable of communicating with the source device 125 via one or more device drivers. The console 130 may include an application 240 that is configured to relay data between the source device 125 and the cloud services 135. The application 240 may comprise a keyword spotter 237 and a media client 238. The keyword spotter 237 may be configured to recognize a wake word or a wake phrase that may be used to initiate a virtual assistant, such as but not limited to Microsoft Cortana. The wake word or wake phrase may be captured by the microphone array 216. Once the wake word has been detected, the console 130 may route an audio stream from the virtual assistance audio pipeline 206 to the virtual assistant services 236 for processing.

The media client 238 may be configured to provide a user interface that allows users to control one or more operating parameters of the source device 125. For example, the media client 238 may allow a user to adjust the volume of the speaker 214, to mute or unmute the microphone array 216, and/or to turn the camera 218 on or off. Muting the microphone array 216 will cause remote participants to be unable to hear what is occurring in the conference room or other environment in which the communication session is based. Turning off the camera 218 will halt the generation of individual media streams for each of the participants in the conference room or other environment and other media streams of the environment so that remote participants will be unable to see what is occurring in the conference room or environment in which the communication session is based. The media client 238 may also enable a user to turn on or off the transcription facilities of the conferencing system, and to turn on or turn off recording of audio and/or video of the communication session.

The media client 238 may be configured to coordinate the output of media streams from the source device 125. The media client 238 may receive stream requests from the cloud services 135, the console 130, and/or from other source devices for generation of a specific stream. For example, the cloud services may be configured to request an audio stream that has been optimized for use with the transcription services 232 or an audio stream that has been optimized for use with the virtual assistant services 256. The media client 238 may be configured to receive various streams of content and/or data from one or more components of the image processing pipeline 208. The media client 238 may also be configured to receive data from other components the source device 125, the console 130, the cloud services 135, and/or other source devices, and may be configured to send one or more data streams to one or more of these devices.

Figure 3:
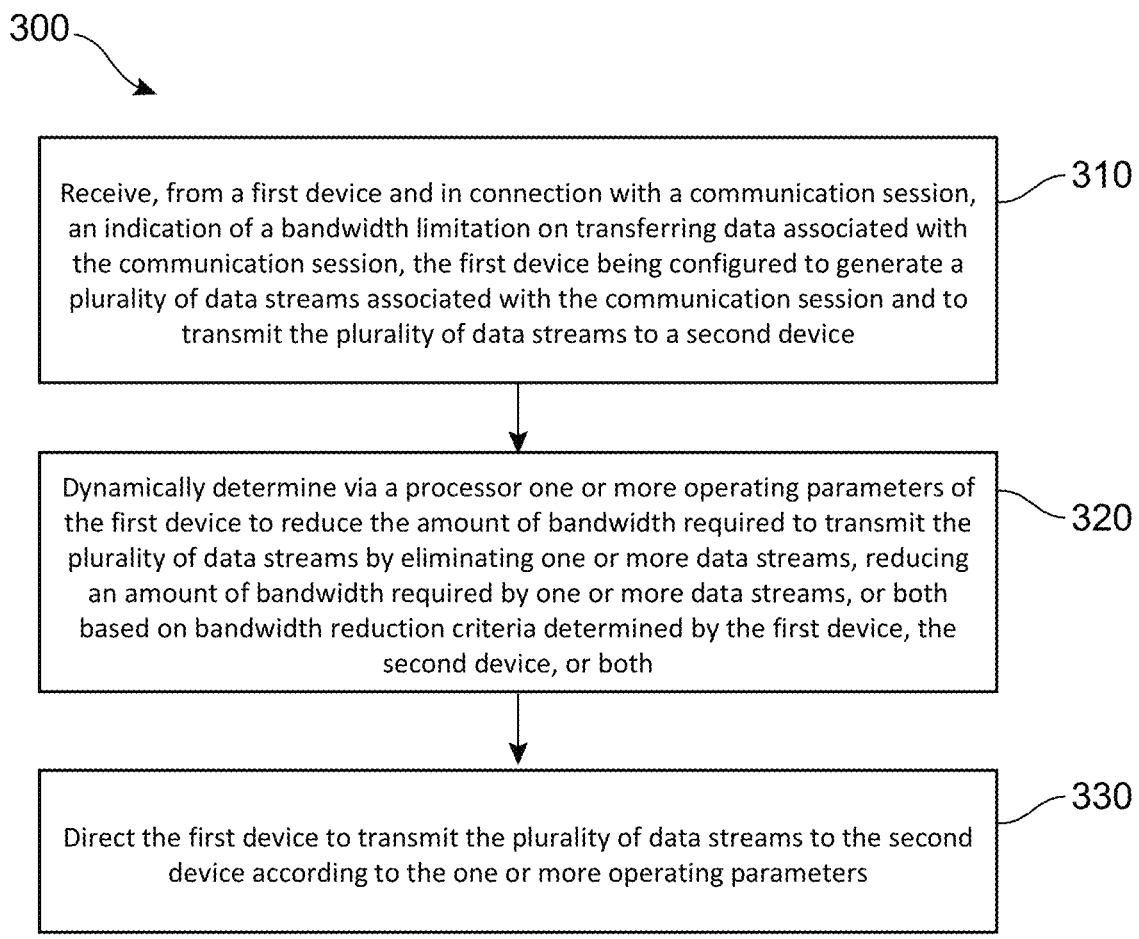
FIG. 3 is a flow diagram of an example process for conducting a communication session.

FIG. 3 is a flow diagram of an example process 300 for managing data streams sent by a source device during a communication session. The process 300 may be implemented in a source device 125, in the cloud services 135, or by a receiving computing device associated with a participant of the communication session. The process illustrated in FIG. 3 can be used to adjust one or more operating parameters of a source device to reduce the amount of bandwidth that the source device requires. The process 300 can be used to prioritize the data streams that are produced by the source device 125 and to configure the source device 125 to stop sending, at least temporarily, one or more data streams that are deemed to be lower priority in response to a bandwidth limitation occurring during a communication session. The process 300 may also be used to throttle one or more data streams by reducing a data rate associated with the one or more data streams. Furthermore, the combination of prioritization and throttling may be used to reduce the amount of bandwidth required to transfer the data streams generated by the source device based on the bandwidth limitation. Such bandwidth limitations may be transient in nature, and the one or more operating parameters of the source device 125 may be returned to a previous state in which the source device 125 may generate and transfer all of the multiple data streams that source device 125 is configured to produce as part of a communication session.

The process 300 may include an operation 310 in which, in connection with a communication session, receiving an indication of a bandwidth limitation on transferring data associated with the communication session from a first device configured to generate a plurality of data streams associated with the communication session and to transmit the plurality of data streams to a second device. As discussed in the preceding example, the source device 125 may be capable of producing numerous audio and audiovisual data streams, including but not limited to a panoramic view of an environment in which a communication session is taking place, dedicated media streams for each participant of the communication session derived from the panoramic view, multi-channel lossless audio, specialized audio streams for transcription and/or virtual assistant services. In situations where a bandwidth limitation arises, the source device 125 may need to at least temporarily stop sending one or more of the data streams and/or reduce an amount of bandwidth required to send one or more data streams.

A bandwidth limitation may occur at various points throughout a communication system. For example, a data link between the source device 125 and the cloud services 135 may experience a limited bandwidth situation. A link between cloud services, such as the meeting cloud services 234 and the transcription cloud services 232 may result in a constrained bandwidth situation. A link between the cloud services 135 and one or more receiver devices that may receive one or more of the data streams generated by the source device 125 and/or information derived therefrom, such as a transcript generated by the transcription services 232. The source device 125, the cloud services 135, the other source devices (not shown) also associated with the communication session, and/or the receiver devices, such as the remote device 140a-140c, may each be configured to monitor for bandwidth decreases associated with one or more communication links that these respective devices use for transmitting and/or receiving data associated with the communication session. Each of the devices may be configured to periodically test bandwidth on the communication links used by the devices and to send a message to the meeting cloud services 233 reporting a status of these communication links. The transcription cloud services 232, the meetings cloud services 233, and the virtual assistant cloud services 236 may each be configured to test communication links used to communicate during the communication session to identify bandwidth limitations. The meeting cloud services 235 may be configured to identify source devices, cloud services, and/or receiver devices that may be impacted by these bandwidth limitations.

The process 300 may include an operation 320 in which one or more operating parameters of the first device are dynamically determined to reduce the amount of bandwidth required to transmit the plurality of data streams by eliminating one or more data streams, reducing an amount of bandwidth required by one or more data streams, or both based on bandwidth reduction criteria determined by the first device, the second device, or both. The one or more operating parameters may define which data streams that the source device 125 may generate and transmit during the communication session and whether the one or more data stream to be transmitted are to have their data rates decreased in order to reduce the bandwidth required by the source device 125 to transmit the data streams.

The configuration of the one or more operating parameters may be controlled enterprise policy settings associated with the source device 125. The enterprise policy settings may be selected by administrators of a company or other organization that manages the source device. The enterprise policy settings may be configured by an administrator according to corporate or organization guidelines for handling of data streams by the source device 130 in circumstance where a bandwidth limitation is being experienced that may limit the amount of data that may be transmitted by the source device 125. The guidelines may indicate a priority associated with each type data stream that the source device 125 may produce and an indication whether the data stream may be throttled or should be at least be temporarily stopped. The highest priority data streams will be transmitted first based on the available bandwidth, while the lower priority data streams may only be transmitted and/or throttled if enough bandwidth remains to handle those lower priority data streams. The enterprise policy settings may also specify a minimum available bandwidth for operating a communication session, and the source device 125 may refuse to connect or disconnect from an existing connection if the minimum available bandwidth is not available. The enterprise policy settings may also request that all data streams that may be rendered by the cloud services 135 from one or more other data streams be paused and those data streams be rendered by the cloud services while the bandwidth limitation is in effect.

The configuration of the one or more operating parameters may be controlled by user policy settings where the source device 125 is a personal computing device. The source device 125 may be configured to access the policy information at the start of the communication session and can dynamically change the one or more operating parameters of the source device according to the enterprise policy information or the user policy information. The source device 125 may include a user interface that allows the user to configure the operating parameters of the source device 125 in a similar fashion as the enterprise policy settings above in which the user may indicate a priority associated with each type data stream that the source device 125 may produce and an indication whether the data stream may be throttled or should be at least be temporarily stopped. The user interface may also provide a set of preset configurations of the operating parameters that less technical users may select from, such as "preserve audio quality" or "pause transcriptions and virtual assistant." Other combinations of preset settings may be provided. Furthermore, the user may also request that all data streams that may be rendered by the cloud services 135 from one or more other data streams be paused and those data streams be rendered by the cloud services while the bandwidth limitation is in effect.

The source device 125 may also receive configuration commands from the cloud services 135 to stop sending and/or throttle one or more types of data stream produced by the source device 125. The cloud services 135 may send a command indicating that the source device 125 should stop sending one or more data streams that the cloud services 135 may be able to generate on behalf of the source device 125 based on other data streams that the source device 125 may continue to send even under the bandwidth restriction. The cloud services 320 may also instruct one or more source devices 125 to stop sending certain data streams that may be obtained from a different source device 125 that is also part of the same communication session.

The process 300 may include an operation 330 in which the first device is directed to transmit the plurality of data streams to the second device according to the one or more operating parameters. The source device 125 is configured to operate according to the one or more operating parameters configured in the previous operation. These parameters may define which data streams should and which data streams should not be sent by the source device 125 while the bandwidth limitation is present. The available bandwidth may be continually evaluated by the source device 125, the cloud services 135, and the receiver devices, and as the bandwidth availability changes, the operating parameters of the source device 125 may be updated accordingly.

The following examples illustrates some additional situations where the source device 125 may be configured to reduce the bandwidth required to transmit the data streams by the source device 125. The source device 125 may be configured in these examples based on policy constraints associated with the source device 125 or based on commands received from the cloud services 135.

In one example implementation, the source device 125 can be configured to identify one or more data streams that may alternatively be generated by the cloud services 135 or other intermediary recipient device(s) from one or more other data streams provided by the source device 125. For example, in response to a bandwidth limitation arising, the source device 125 may be configured to determine how much bandwidth is available for the source device 125 to send data streams to the cloud services 135 and/or another one or more recipient devices. The source device 130 may be configured to access configuration information stored in a persistent memory of the source device 125. The configuration information may identify one or more data streams and/or type of data stream that may alternatively be generated by the cloud services 135 and which other data stream or data streams can provide a source from which the cloud services 135 or other intermediary device(s) may generate the data streams that have been suppressed at the source device 125.

In one example implementation, the source device 125 may be configured to generate a separate media stream for each participant of a communication session. These separate streams may be generated at the source device 125 from a panoramic media stream comprising high-resolution panoramic images and/or video of the environment surrounding the source device 125. The image processing pipeline 208 may generate a dedicated media stream for each participant that has been identified in the panoramic media stream. In situations where a bandwidth limitation has arisen, the source device 125 may make a determination that the sending of dedicated media streams for each participant may be at least temporarily halted. The source device 125 may continue to send the panoramic media stream to one or more recipient devices, such as the cloud services 135, along with metadata that may be used by a device receiving the panoramic media stream to facilitate generating the dedicated media streams for each participant of the communication session. In some implementations, the metadata may include intermediate processing information for generating the dedicated media streams that can facilitate generating the dedicated media streams. For example, the metadata may include location information of one or more participants in the high-definition panoramic media stream determined by the image processing pipeline. This information can be used by the device receiving the metadata and the panoramic media stream to more quickly generate the dedicated media streams for each of the participants, because the receiving device does not need to body and/or head and face detection already performed by the image processing pipeline 208 of the source device 125.

The source device 125 may be configured to suppress the generation of one or more other dedicated media streams in order to conserve bandwidth. For example, the source device 125 may stop sending one or more of a last active speaker stream, an active speaker stream, a presentation surface stream, or other such dedicated media streams in response to a bandwidth constraint. The metadata send by the source device 125 can provide information that the cloud services 135 and/or other recipients of the intelligent metadata can use to generate these one or more media streams from the panoramic stream output by the camera 214.

In some implementations, the source device 125 may be configured to reduce the bandwidth requirements by at least temporarily halting sending of specialized audio streams that can be derived from another audio stream by the cloud services 135 or another recipient device. In particular, the source device 125 may halt an audio stream output by the transcription audio pipeline 202 and/or the virtual assistant audio pipeline 206. The configuration information accessed by the source device 125 may indicate that the one or both of the transcription audio and the virtual assistant audio are of a lower priority than providing high quality meeting audio for the communication session. The meeting audio stream may include voice audio communications by participants of the communications session, which may be high-quality lossless audio stream data. The cloud services 135 or other recipient of the meeting audio stream may be configured to process the meeting audio stream to generate a virtual assistant audio stream optimized for the virtual assistant cloud services 236 and/or to generate a transcription audio stream optimized for the transcription cloud services 232. The virtual assistant audio stream and/or the transcription audio stream may be indicated to be lower priority than the meeting audio in the configuration information accessed by the source device 125, because any degradation in the audio quality of the meeting audio streams may be immediately noticeable and distracting to participants of the communication session. If the bandwidth limitation is resolved, the source device 125 may resume generating the virtual assistant audio stream optimized for the virtual assistant cloud services 236 and/or the transcription audio stream optimized for the transcription cloud services 232.

In some implementations, the source device 125 may be one of a plurality of source devices that are located in the environment in which the communication session is being conducted. For example, the environment may be a conference room which two or more source devices 125 which may each be configured to capture audio and/or video of the communication session and to transmit a plurality of data streams associated with the communication session. The source device 125 may be configured to determine that at least one other source device is configured to generate at least one similar data stream as the source device 125 by exchanging signals with the other source devices that are registered as part of the communication session. The cloud services 135 may be configured to determine how many source devices are associated with a particular communication session and to select which device(s) may produce a particular type of data stream while others at least temporarily stop generating that type of data stream. The cloud services 135 may send a message to each source device 125 comprising stream request and/or stream suppression commands. This approach can limit the transmission of duplicate data streams from multiple source devices 125 that are part of the same communication session.

In some implementations, the source device 125 may identify a first subset of one or more data streams of the plurality of data streams for which a reduction in a bit rate, a reduction in a sample rate, or a reduction in a frame rate of one or more of the plurality of data streams that would not result in a reduction in meeting audio quality, and configuring the operating parameters of the source device 125 to generate the first subset of one or more data streams by reducing the bit rate, the sample rate, or the frame rate of data associated with the data streams. The source device 125 may access configuration information that indicates which data streams would be least impacted by reducing the bit rate, the sample rate, or the frame rate of data associated with the data streams. In some implementations, the dedicated data streams associated with a presentation surface, a model or exhibit, or other object located in the environment in which the communication session is being held may be selected for a reduction in a bit rate, a reduction in a sample rate, or a reduction in a frame rate of one or more of the plurality of data streams that would not result in a reduction in meeting audio quality.

In some implementations, the source device 125 may reduce a number of audio channels transmitted from the first device to reduce bandwidth requirements without reducing a meeting audio quality. Each audio channel may comprise a separate one of the plurality of data streams. For example, the audio obtained from the microphone array 216 may be dropped from eight channels down to one channel. The resulting audio may be of sufficiently high quality for conveying meeting audio and for processing use by the virtual assistant 236 to identify when a participant issues a command or query to the virtual assistant. The resulting audio may also be sufficient for a least some features of the transcription services 232, such as generating a transcript of what was said during the communication session. However, the without the multi-channel data from the microphone array 216, the transcription services 232 may not be able to perform beamforming, which can be used to determine a direction from which a voice or other sound originated in the environment in which the communication session took place. This directional information could be used to disambiguate which participate was speaking during the communication session so that parts of the transcript associated with that user may be marked as origination from that user. While this feature may be lost if the in situations where bandwidth constraints arise, the transcript of the communication session itself still may be created, and readers of the transcript may be able to determine who said what based on contextual clues within the transcript.

Examples of the operations illustrated in the flow chart shown in FIG. 3 are described in connection with FIGS. 1 and 2. It is understood that the specific order or hierarchies of elements and/or operations disclosed in FIG. 3 are example approaches. Based upon design preferences, it is understood that the specific order or hierarchies of elements and/or operations in FIG. 3 may be rearranged while remaining within the scope of the present disclosure. FIG. 3 presents elements of the various operations in sample orders and are not meant to be limited to the specific orders or hierarchies presented. Also, the accompanying claims present various elements and/or various elements of operations in sample orders and are not meant to be limited to the specific elements, orders, or hierarchies presented.

The detailed examples of systems, devices, and techniques described in connection with FIGS. 1-3 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-3 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 4:
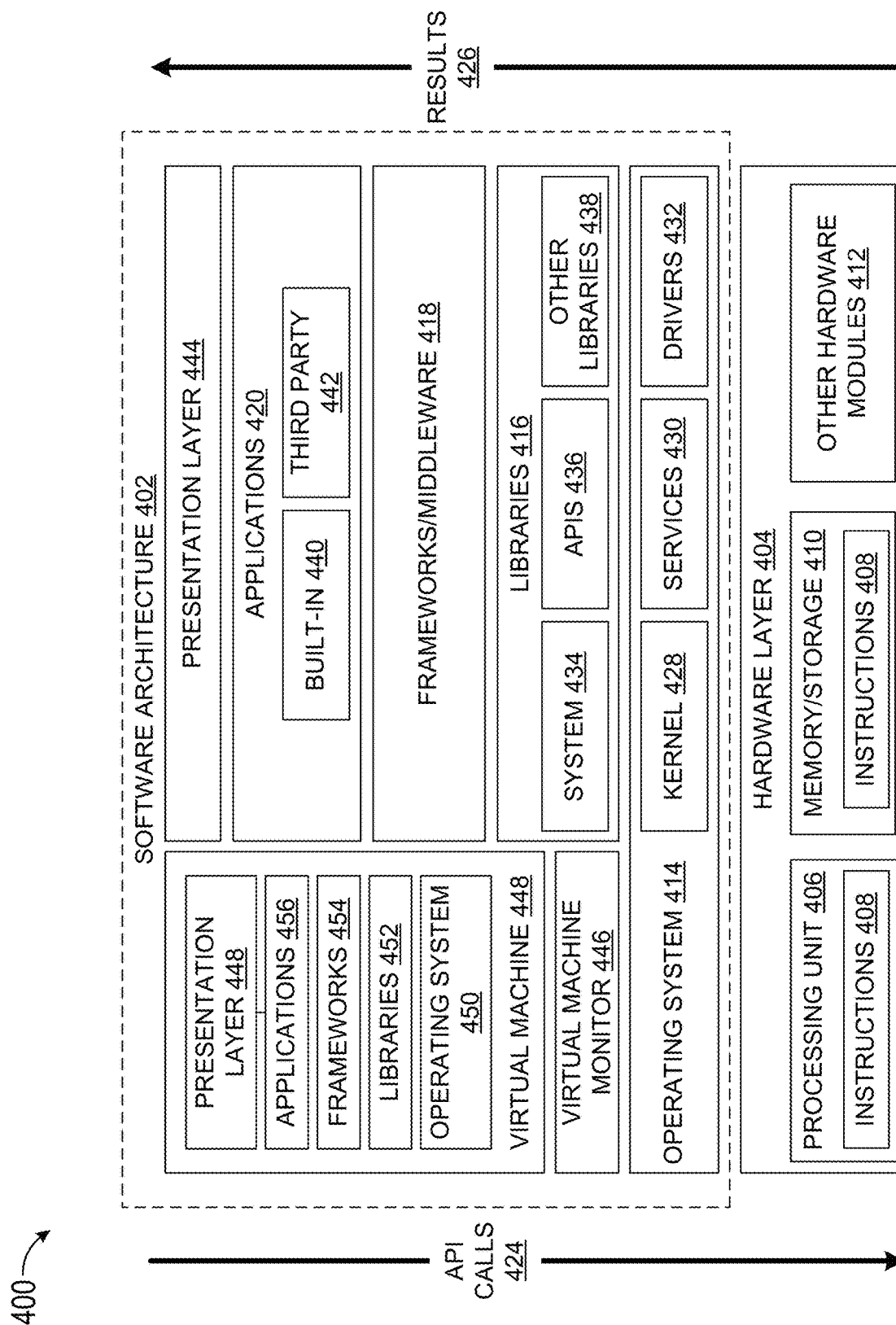
FIG. 4 is a block diagram illustrating an example software architecture, various portions of which may be used in conjunction with various hardware architectures herein described, which may implement any of the features described herein.

FIG. 4 is a block diagram 400 illustrating an example software architecture 402, various portions of which may be used in conjunction with various hardware architectures herein described, which may implement any of the above-described features. FIG. 4 is a non-limiting example of a software architecture and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 and associated executable instructions 408. The executable instructions 408 represent executable instructions of the software architecture 402, including implementation of the methods, modules and so forth described herein. The hardware layer 404 also includes a memory/storage 410, which also includes the executable instructions 408 and accompanying data. The hardware layer 404 may also include other hardware modules 412. Instructions 408 held by processing unit 408 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular platform. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine 600 of FIG. 6, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 414, libraries 452, frameworks 454, applications 456, and/or a presentation layer 458.

Figure 5:
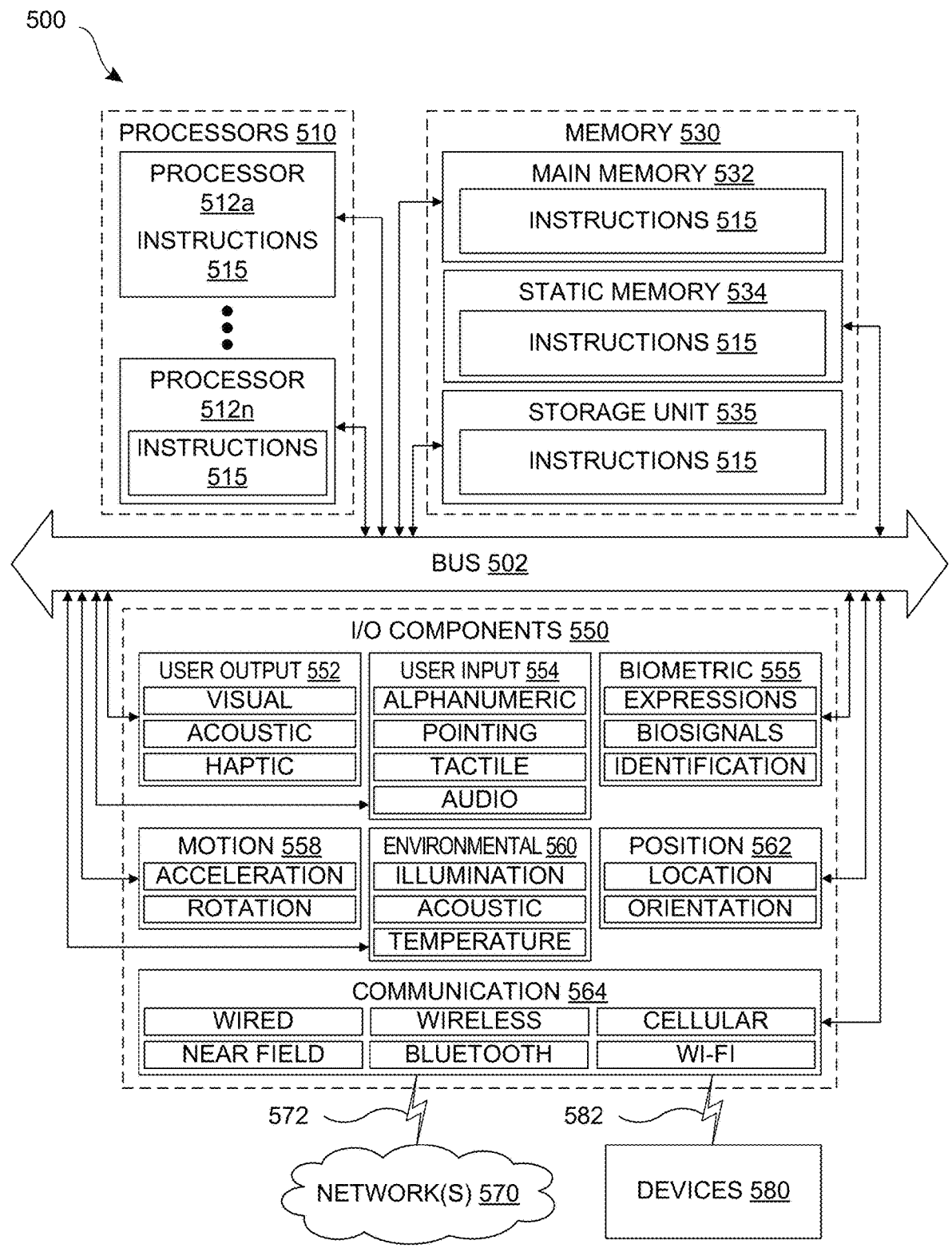
FIG. 5 is a block diagram illustrating components of an example machine configured to read instructions from a machine-readable medium and perform any of the features described herein.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement modules or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The particular examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560, and/or position components 562, among a wide array of other physical sensor components. The biometric components 556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 558 may include, for example, acceleration sensors (for example, an accelerometer) and rotation sensors (for example, a gyroscope). The environmental components 560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 562 may include, for example, location sensors (for example, a Global Position System (GPS)

receiver), altitude sensors (for example, an air pressure sensor from which altitude may be derived), and/or orientation sensors (for example, magnetometers).

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 562, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items: Item 1. A data processing system comprising: a processor; and a computer-readable medium storing executable instructions for causing the processor to perform operations comprising: receiving, from a first device and in connection with a communication session, an indication of a bandwidth limitation on transferring data associated with the communication session, the first device being configured to generate a plurality of data streams associated with the communication session and to transmit the plurality of data streams to a second device; dynamically determining one or more operating parameters of the first device to reduce the amount of bandwidth required to transmit the plurality of data streams by eliminating one or more data streams, reducing an amount of bandwidth required by one or more data streams, or both based on bandwidth reduction criteria determined by the first device, the second device, or both; and directing the first device to transmit the plurality of data streams to the second device according to the one or more operating parameters.

Item 2. The data processing system of item 1, wherein to dynamically determine one or more operating parameters of the first device, the computer-readable medium further stores executable instructions for causing the processor to perform operations comprising: identifying a first subset of one or more data streams of the plurality of data streams that can be generated at the second device based on a second subset of the one or more other data streams of the plurality of data streams; and determining that transmission of the first subset of the one or more data streams to the at least one recipient device should be stopped.

Item 3. The data processing system of item 2, wherein the first subset of data streams comprise a set of one or more dedicated video streams each associated with a participant or object of interest in an environment in which the communication session is being conducted; and wherein the second subset of the one or more data streams includes a data stream comprising a media stream of a panoramic view of the environment in which the communication session is being conducted.

Item 4. The data processing system of item 1, wherein to dynamically determine one or more operating parameters of the first device, the computer-readable medium further stores executable instructions for causing the processor to perform operations comprising: identifying a first subset of one or more data streams of the plurality of data streams that can be obtained from at least one other first device located in an environment in which the communication session is being conducted; and determining that transmission of the first subset of the one or more data streams to the at least one recipient device should be stopped.

Item 5. The data processing system of item 1, wherein to dynamically determine one or more operating parameters of the first device, the computer-readable medium further stores executable instructions for causing the processor to perform operations comprising: identifying a first subset of one or more data streams of the plurality of data streams for which a reduction in a bit rate, a reduction in a sample rate, or a reduction in a frame rate of one or more of the plurality of data streams that would not result in a reduction in meeting audio quality; and reducing the bit rate, the sample rate, or the frame rate of the first subset of one or more data streams.

Item 6. The data processing system of item 1, wherein to dynamically determine one or more operating parameters of the first device, the computer-readable medium further stores executable instructions for causing the processor to perform operations comprising: reducing a number of audio channels transmitted from the first device to reduce bandwidth requirements without reducing a meeting audio quality, wherein each audio channel comprises a separate one of the plurality of data streams.

Item 7. The data processing system of item 6, wherein to reduce the number of audio channels transmitted, the computer-readable medium further stores executable instructions for causing the processor to perform operations comprising: eliminating at least one data stream associated with a transcription service, at least one data stream associated with a virtual assistant, or both to reduce the bandwidth requirements without reducing meeting audio quality.

Item 8. A method executed by a data processing system for conducting a communication session, the method comprising: receiving, from a first device and in connection with a communication session, an indication of a bandwidth limitation on transferring data associated with the communication session, the first device being configured to generate a plurality of data streams associated with the communication session and to transmit the plurality of data streams to a second device; dynamically determining via a processor one or more operating parameters of the first device to reduce the amount of bandwidth required to transmit the plurality of data streams by eliminating one or more data streams, reducing an amount of bandwidth required by one or more data streams, or both based on bandwidth reduction criteria determined by the first device, the second device, or both; and directing via the processor the first device to transmit the plurality of data streams to the second device according to the one or more operating parameters.

Item 9. The method of item 8, wherein dynamically determining one or more operating parameters of the first device further comprises: identifying a first subset of one or more data streams of the plurality of data streams that can be generated at the second device based on a second subset of the one or more other data streams of the plurality of data streams; and determining that transmission of the first subset of the one or more data streams to the at least one recipient device should be stopped.

Item 10. The method of item 9, wherein the first subset of data streams comprise a set of one or more dedicated video streams each associated with a participant or object of interest in an environment in which the communication session is being conducted; and wherein the second subset of the one or more data streams includes a data stream comprising a media stream of a panoramic view of the environment in which the communication session is being conducted.

Item 11. The method of item 8, wherein dynamically determining one or more operating parameters of the first device further comprises: identifying a first subset of one or more data streams of the plurality of data streams that can be obtained from at least one other first device located in an environment in which the communication session is being conducted; and determining that transmission of the first subset of the one or more data streams to the at least one recipient device should be stopped.

Item 12. The method of item 8, wherein dynamically determining one or more operating parameters of the first device further comprises: identifying a first subset of one or more data streams of the plurality of data streams for which a reduction in a bit rate, a reduction in a sample rate, or a reduction in a frame rate of one or more of the plurality of data streams that would not result in a reduction in meeting audio quality; and reducing the bit rate, the sample rate, or the frame rate of the first subset of one or more data streams.

Item 13. The method of item 8, wherein dynamically determining one or more operating parameters of the first device further comprises: reducing a number of audio channels transmitted from the first device to reduce bandwidth requirements without reducing a meeting audio quality, wherein each audio channel comprises a separate one of the plurality of data streams.

Item 14. The method of item 13, wherein reducing the number of audio channels transmitted further comprises: eliminating at least one data stream associated with a transcription service, at least one data stream associated with a virtual assistant, or both to reduce the bandwidth requirements without reducing meeting audio quality.

Item 15. A memory device storing instructions that, when executed on a processor of a computing device, cause the computing device to conduct a communication session, by: receiving, from a first device and in connection with a communication session, an indication of a bandwidth limitation on transferring data associated with the communication session, the first device being configured to generate a plurality of data streams associated with the communication session and to transmit the plurality of data streams to a second device; dynamically determining one or more operating parameters of the first device to reduce the amount of bandwidth required to transmit the plurality of data streams by eliminating one or more data streams, reducing an amount of bandwidth required by one or more data streams, or both based on bandwidth reduction criteria determined by the first device, the second device, or both; and directing the first device to transmit the plurality of data streams to the second device according to the one or more operating parameters.

Item 16. The memory device of item 15, wherein to dynamically determine one or more operating parameters of the first device, the memory device further stores executable instructions for causing the processor to perform operations comprising: identifying a first subset of one or more data streams of the plurality of data streams that can be generated at the second device based on a second subset of the one or more other data streams of the plurality of data streams; and determining that transmission of the first subset of the one or more data streams to the at least one recipient device should be stopped.

Item 17. The memory device of item 16, wherein the first subset of data streams comprise a set of one or more dedicated video streams each associated with a participant or object of interest in an environment in which the communication session is being conducted; and wherein the second subset of the one or more data streams includes a data stream comprising a media stream of a panoramic view of the environment in which the communication session is being conducted.

Item 18. The memory device of item 15, wherein to dynamically determine one or more operating parameters of the first device, the memory device further stores executable instructions for causing the processor to perform operations comprising: identifying a first subset of one or more data streams of the plurality of data streams that can be obtained from at least one other first device located in an environment in which the communication session is being conducted; and determining that transmission of the first subset of the one or more data streams to the at least one recipient device should be stopped.

Item 19. The memory device of item 15, wherein to dynamically determine one or more operating parameters of the first device, the memory further stores executable instructions for causing the processor to perform operations comprising: identifying a first subset of one or more data streams of the plurality of data streams for which a reduction in a bit rate, a reduction in a sample rate, or a reduction in a frame rate of one or more of the plurality of data streams that would not result in a reduction in meeting audio quality; and reducing the bit rate, the sample rate, or the frame rate of the first subset of one or more data streams.

Item 20. The memory device of item 15, wherein to dynamically determine one or more operating parameters of the first device, the memory device further stores executable instructions for causing the processor to perform operations comprising: reducing a number of audio channels transmitted from the first device to reduce bandwidth requirements without reducing a meeting audio quality, wherein each audio channel comprises a separate one of the plurality of data streams.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
   transmitting a plurality of data streams to a first device over a network, wherein each data stream is configured to cause the first device to perform a specific function;
   dynamically detecting a bandwidth limitation that limits an amount of available bandwidth for transmitting the plurality of data streams;
   dynamically determining bandwidth reduction criteria, responsive to detecting the bandwidth limitation, by identifying a first subset of the plurality of data streams to stop transmitting based on the specific function that each respective data stream causes the first device to perform;
   temporarily stopping transmitting of the first subset of the plurality of data streams configured to cause the first device to perform a first set of functions; and
   continuing to transmit a second subset of the plurality of data streams not included in the first subset of the data streams to the first device to cause the first device to continue to perform a second set of functions.

2. The data processing system of claim 1, wherein to dynamically determine the bandwidth reduction criteria, the computer-readable medium further stores executable instructions for causing the processor to perform operations comprising:
   identifying the first subset of the plurality of data streams to stop transmitting based on the specific function that each respective data stream causes the first device to perform, an amount of bandwidth associated with the respective data stream, and the amount of available bandwidth for transmitting the plurality of data streams.

3. The data processing system of claim 2, wherein to dynamically determine the bandwidth reduction criteria, the computer-readable medium further stores executable instructions for causing the processor to perform operations comprising:
   identifying a third subset of data streams of the second subset of the plurality of data streams for which a bit rate, a sample, rate, or a frame rate of one or more of the second subset of the plurality of data streams may be reduced; and
   reducing the bit rate, the sample, rate, or the frame rate of each data stream of the third subset of data streams to reduce an amount of bandwidth associated with the third subset of data streams.

4. The data processing system of claim 1, further comprising instructions for causing the processor to perform operations comprising:
   receiving the plurality of data streams from a second device over the network; and
   wherein the bandwidth limitation limits the amount of available bandwidth for transmitting the plurality of data streams to the first device, for receiving the plurality of data streams from the second device, or both.

5. The data processing system of claim 4, further comprising instructions for causing the processor to perform operations comprising:
   sending a command over the network to the first device to cause the first device to temporarily stop transmitting the first subset of the plurality of data streams.

6. The data processing system of claim 1, wherein the computer-readable medium further stores executable instructions for causing the processor to perform operations comprising:
- dynamically detecting that the bandwidth limitation has been resolved; and
- transmitting all data streams of the plurality of data streams to the first device in response to detecting that the bandwidth limitation has been resolved.

7. The data processing system of claim 1, wherein to dynamically determine the bandwidth reduction criteria, the computer-readable medium further stores executable instructions for causing the processor to perform operations comprising:
- identifying a first data stream of the plurality of data streams that can be generated at the first device from content of one or more second data streams of the plurality of data streams; and
- assigning the first data stream to the first subset of the plurality of data streams to be temporarily stopped.

8. The data processing system of claim 1, further comprising instructions for causing the processor to perform operations comprising:
- dynamically detecting that the amount of available bandwidth associated with the bandwidth limitation has changed;
- dynamically redetermining the bandwidth reduction criteria, responsive to detecting the amount of bandwidth associated with the bandwidth limitation has changed, by identifying an updated first subset of the plurality of data streams to stop transmitting based on the function that each respective data stream causes the first device to perform, an amount of bandwidth associated with the respective data stream, and the amount of available bandwidth for transmitting the plurality of data streams; and
- temporarily stopping transmitting of the updated first subset of the plurality of data streams.

9. A method executed by a data processing system for prioritization of data streams, the method comprising:
- transmitting a plurality of data streams to a first device over a network, wherein each data stream is configured to cause the first device to perform a specific function;
- dynamically detecting a bandwidth limitation that limits an amount of available bandwidth for transmitting the plurality of data streams;
- dynamically determining bandwidth reduction criteria, responsive to detecting the bandwidth limitation, by identifying a first subset of the plurality of data streams to stop transmitting based on the specific function that each respective data stream causes the first device to perform;
- temporarily stopping transmitting of the first subset of the plurality of data streams configured to cause the first device to perform a first set of functions; and
- continuing to transmit a second subset of the plurality of data streams not included in the first subset of the data streams to the first device to cause the first device to continue to perform a second set of functions.

10. The method of claim 9, wherein dynamically determining the bandwidth reduction criteria further comprises:
- identifying the first subset of the plurality of data streams to stop transmitting based on the specific function that each respective data stream causes the first device to perform, an amount of bandwidth associated with the respective data stream, and the amount of available bandwidth for transmitting the plurality of data streams.

11. The method of claim 10, wherein dynamically determining the bandwidth reduction criteria further comprises:
- identifying a third subset of data streams of the second subset of the plurality of data streams for which a bit rate, a sample, rate, or a frame rate of one or more of the second subset of the plurality of data streams may be reduced; and
- reducing the bit rate, the sample, rate, or the frame rate of each data stream of the third subset of data streams to reduce an amount of bandwidth associated with the third subset of data streams.

12. The method of claim 9, further comprising:
- receiving the plurality of data streams from a second device over the network; and
- wherein the bandwidth limitation limits the amount of available bandwidth for transmitting the plurality of data streams to the first device, for receiving the plurality of data streams from the second device, or both.

13. The method of claim 12, further comprising:
- sending a command over the network to the first device to cause the first device to temporarily stop transmitting the first subset of the plurality of data streams.

14. The method of claim 9, further comprising:
- dynamically detecting that the bandwidth limitation has been resolved; and
- transmitting all data streams of the plurality of data streams to the first device in response to detecting that the bandwidth limitation has been resolved.

15. The method of claim 9, wherein dynamically determining the bandwidth reduction criteria further comprises:
- identifying a first data stream of the plurality of data streams that can be generated at the first device from content of one or more second data streams of the plurality of data streams; and
- assigning the first data stream to the first subset of the plurality of data streams to be temporarily stopped.

16. The method of claim 9, further comprising:
- dynamically detecting that the amount of available bandwidth associated with the bandwidth limitation has changed;
- dynamically redetermining the bandwidth reduction criteria, responsive to detecting the amount of bandwidth associated with the bandwidth limitation has changed, by identifying an updated first subset of the plurality of data streams to stop transmitting based on the function that each respective data stream causes the first device to perform, an amount of bandwidth associated with the respective data stream, and the amount of available bandwidth for transmitting the plurality of data streams; and
- temporarily stopping transmitting of the updated first subset of the plurality of data streams.

17. A memory device storing instructions that, when executed on a processor of a data processing system, cause the processor of the data processing system to prioritize data streams, by:
- transmitting a plurality of data streams to a first device over a network, wherein each data stream is configured to cause the first device to perform a specific function;
- dynamically detecting a bandwidth limitation that limits an amount of available bandwidth for transmitting the plurality of data streams;

dynamically determining bandwidth reduction criteria, responsive to detecting the bandwidth limitation, by identifying a first subset of the plurality of data streams to stop transmitting based on the specific function that each respective data stream causes the first device to perform;

temporarily stopping transmitting of the first subset of the plurality of data streams configured to cause the first device to perform a first set of functions; and continuing to transmit a second subset of the plurality of data streams not included in the first subset of the data streams to the first device to cause the first device to continue to perform a second set of functions.

18. The memory device of claim 17, wherein to dynamically determine the bandwidth reduction criteria, the memory device further stores executable instructions for causing the processor to perform operations comprising:

identifying the first subset of the plurality of data streams to stop transmitting based on the specific function that each respective data stream causes the first device to perform, an amount of bandwidth associated with the respective data stream, and the amount of available bandwidth for transmitting the plurality of data streams.

19. The memory device of claim 18, wherein to dynamically determine the bandwidth reduction criteria, the memory device further stores executable instructions for causing the processor to perform operations comprising:

identifying a third subset of data streams of the second subset of the plurality of data streams for which a bit rate, a sample, rate, or a frame rate of one or more of the second subset of the plurality of data streams may be reduced; and reducing the bit rate, the sample, rate, or the frame rate of each data stream of the third subset of data streams to reduce an amount of bandwidth associated with the third subset of data streams.

20. The memory device of claim 17, further comprising instructions for causing the processor to perform operations comprising:

receiving the plurality of data streams from a second device over the network; and wherein the bandwidth limitation limits the amount of available bandwidth for transmitting the plurality of data streams to the first device, for receiving the plurality of data streams from the second device, or both.

* * * * *